(12) United States Patent
Lee et al.

(10) Patent No.: US 9,368,792 B2
(45) Date of Patent: Jun. 14, 2016

(54) NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: KNU-Industry Cooperation Foundation, Chuncheon-si (KR)

(72) Inventors: Sung-Man Lee, Chuncheon-si (KR); Yoon-Soo Park, Chuncheon-si (KR)

(73) Assignee: KANGWON NATIONAL UNIVERSITY UNIVERSITY-INDUSTRY COOPERATION FOUNDATION, Chuncheon-Si (KR)

( * ) Notice: Subject to any disclaimer, the term of this patent is extended or adjusted under 35 U.S.C. 154(b) by 155 days.

(21) Appl. No.: 14/191,706

(22) Filed: Feb. 27, 2014

(65) Prior Publication Data
US 2014/0178762 A1    Jun. 26, 2014

Related U.S. Application Data

(63) Continuation-in-part of application No. 13/969,812, filed on Aug. 19, 2013.

(30) Foreign Application Priority Data

Aug. 28, 2012  (KR) .................. 10-2012-0094539
Jul. 5, 2013   (KR) .................. 10-2013-0079292

(51) Int. Cl.
*H01M 4/133*  (2010.01)
*H01M 4/36*   (2006.01)
(Continued)

(52) U.S. Cl.
CPC .............. *H01M 4/366* (2013.01); *C01B 31/04* (2013.01); *H01M 4/0402* (2013.01);
(Continued)

(58) Field of Classification Search
CPC ........................... H01M 4/133; H01M 10/052
See application file for complete search history.

(56) References Cited

U.S. PATENT DOCUMENTS 5,554,462 A    9/1996  Flandrois
6,156,432 A   12/2000  Mabuchi
(Continued)

FOREIGN PATENT DOCUMENTS

CN   1226224   8/1999
CN   1913200   2/2007
(Continued)

OTHER PUBLICATIONS

Zhang et al., "Preparation and Electrochemistry of Hydrous Ruthenium Oxide/Active Carbon Electrode Materials for Supercapacitor", Journal of the Electrochemical Society, vol. 148 Issue 12, A1362-A1367, Nov. 7, 2001.

*Primary Examiner* — Stewart Fraser
*Assistant Examiner* — Olatunji Godo
(74) *Attorney, Agent, or Firm* — Lex IP Meister, PLLC

(57) ABSTRACT

Disclosed are a negative active material for a rechargeable lithium battery including a spherically-shaped natural graphite-modified composite particle including: a spherically-shaped natural graphite particle where flake-shaped natural graphite fragments build up and assemble into a cabbage or random shape; and amorphous or semi-crystalline carbon, wherein an open gap between the flake-shaped natural graphite fragments is positioned on a surface part or inside the spherically-shaped natural graphite particle, the amorphous or semi-crystalline carbon is coated on the surface of the spherically-shaped natural graphite particle, and the amorphous or semi-crystalline carbon is present in the open gap, and thereby the open gap positioned on the surface part and inside the spherically-shaped natural graphite particle is maintained, a method of preparing the same, and a rechargeable lithium battery including the same.

5 Claims, 17 Drawing Sheets

(51) Int. Cl.
*H01M 4/1393* (2010.01)
*C01B 31/04* (2006.01)
*H01M 4/04* (2006.01)
*H01M 4/587* (2010.01)
*H01M 10/052* (2010.01)

(52) U.S. Cl.
CPC ........... *H01M 4/0471* (2013.01); *H01M 4/133* (2013.01); *H01M 4/1393* (2013.01); *H01M 4/587* (2013.01); *C01P 2004/61* (2013.01); *H01M 10/052* (2013.01); *Y02E 60/122* (2013.01)

(56) References Cited

U.S. PATENT DOCUMENTS

| | | | |
|---|---|---|---|
| 6,482,547 B1 * | 11/2002 | Yoon | H01M 4/133 429/218.1 |
| 8,999,581 B2 | 4/2015 | Lee | |
| 2007/0190413 A1 * | 8/2007 | Lee | H01M 4/386 429/218.1 |
| 2010/0143798 A1 | 6/2010 | Zhamu | |
| 2011/0171532 A1 * | 7/2011 | Okanishi | C01B 31/04 429/231.8 |

FOREIGN PATENT DOCUMENTS

| | | |
|---|---|---|
| CN | 101159323 | 4/2008 |
| CN | 101449410 | 6/2009 |
| CN | 102376937 | 3/2012 |
| JP | 2009-535776 | 10/2009 |
| JP | 2010-501970 | 1/2010 |
| JP | 2010501970 | 1/2010 |
| JP | 2012-084520 | 4/2012 |
| KR | 1019990053899 | 7/1999 |
| KR | 20000029478 | 5/2000 |
| KR | 1020040096279 | 11/2004 |
| KR | 20050057237 | 6/2005 |
| KR | 1020080093242 | 10/2008 |
| KR | 1020090031421 | 3/2009 |
| KR | 1020090052220 | 5/2009 |
| KR | 20110133701 | 12/2011 |
| KR | 20120057792 | 6/2012 |
| WO | 2007-136164 | 11/2007 |
| WO | 2011/125577 | 10/2011 |

* cited by examiner

NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

RELATED APPLICATIONS

This application is a continuation-in-part under 35 U.S.C. §120 of U.S. application Ser. No. 13/969,812, filed on Aug. 19, 2013, which claims priorities under 35 U.S.C. §119 to Korean Application Nos. 10-2012-0094539 and 10-2013-0079292, filed on Aug. 28, 2012, and Jul. 5, 2013, respectively, the entire contents of each of which are incorporated herein by reference.

BACKGROUND

1. Field

A negative active material for a rechargeable lithium battery, a method of preparing the same, and a rechargeable lithium battery including the same are disclosed.

2. Description of the Related Art

At present, a crystalline graphite material is being used as a negative active material for a rechargeable lithium battery. The crystalline graphite is classified into artificial graphite and natural graphite. Since the artificial graphite is obtained by heat-carbonizing a carbon precursor at a high temperature of greater than or equal to about 2800° C. under an inert atmosphere, impurity removal and graphitization, costs for preparation of the artificial graphite are high. Thus, the natural graphite has been increasingly used in recent times.

However, a flake-shaped natural graphite particle as a negative active material has a problem of deteriorating uniformity due to anisotropic characteristics of its shape when a slurry is coated to manufacture an electrode, and also sharply deteriorates battery characteristics since the particle is arranged along with a current collector by compression and pressure. Accordingly, spherically-shaped natural graphite obtained by assembling flake-shaped graphite into a spherical shape is commercially available. However, the spherically-shaped natural graphite requires improved high-rate charge and discharge and cycle-life characteristics.

SUMMARY

One embodiment provides a negative active material for a rechargeable lithium battery having excellent high-rate charge and discharge characteristics and cycle-life characteristics.

Another embodiment provides a method of preparing the negative active material for a rechargeable lithium battery.

Yet another embodiment provides a rechargeable lithium battery including the negative active material for a rechargeable lithium battery.

One embodiment provides a negative active material for a rechargeable lithium battery that includes a spherically-shaped natural graphite-modified composite particle including a spherically-shaped natural graphite particle where flake-shaped natural graphite fragments build up and assemble into a cabbage or random shape, and amorphous or semi-crystalline carbon, wherein an open gap between the flake-shaped natural graphite fragments is positioned on a surface part and inside the spherically-shaped natural graphite particle, the amorphous or semi-crystalline carbon is coated on the surface of the spherically-shaped natural graphite particle, and the amorphous or semi-crystalline carbon is present in the open gap, and thereby the open gap positioned on the surface part and inside the spherically-shaped natural graphite particle is maintained.

The spherically-shaped natural graphite particle may have an average particle diameter (D50) of about 5 to about 40 µm.

The amorphous or semi-crystalline carbon may be included in an amount of about 1 to about 20 parts by weight based on 100 parts by weight of the spherically-shaped natural graphite particle.

The spherically-shaped natural graphite-modified composite particle may further include a lithium compound selected from $Li_2O$, $Li_2CO_3$, and a combination thereof, the lithium compound may be coated on the surface of the spherically-shaped natural graphite particle, and the lithium compound may be present in the open gap positioned on the surface part and inside the spherically-shaped natural graphite particle.

The lithium compound may be included in an amount of about 0.01 to about 10 parts by weight based on 100 parts by weight of the spherically-shaped natural graphite particle.

Another embodiment provides a method of preparing a negative active material for a rechargeable lithium battery that includes: preparing a solution including a spherically-shaped natural graphite particle where flake-shaped natural graphite fragments build up and assemble into a cabbage or random shape, an amorphous or semi-crystalline carbon precursor, and a solvent; performing ultrasonication on the solution, opening between the flake-shaped natural graphite fragments of a surface part and inside the spherically-shaped natural graphite particle to form an open gap while maintaining crystallinity of the spherically-shaped natural graphite particle, and simultaneously coating the surface of the spherically-shaped natural graphite particle with the amorphous or semi-crystalline carbon precursor and impregnating the amorphous or semi-crystalline carbon precursor in the open gap present on the surface part and inside the spherically-shaped natural graphite particle; drying the solution subjected to the ultrasonication to obtain a spherically-shaped natural graphite-modified particle; and heat-treating the spherically-shaped natural graphite-modified particle to prepare a spherically-shaped natural graphite-modified composite particle including amorphous or semi-crystalline carbon that is coated on the surface of the spherically-shaped natural graphite particle and that is present in the open gap present on the surface part and inside the spherically-shaped natural graphite particle.

Yet another embodiment provides a method of preparing a negative active material for a rechargeable lithium battery that includes: preparing a solution including a spherically-shaped natural graphite particle where flake-shaped natural graphite fragments build up and assemble into a cabbage or random shape, an amorphous or semi-crystalline carbon precursor, lithium acetate, and a solvent; performing ultrasonication on the solution, opening between the flake-shaped natural graphite fragments of a surface part and inside the spherically-shaped natural graphite particle to form an open gap while maintaining crystallinity of the spherically-shaped natural graphite particle, and simultaneously coating the surface of the spherically-shaped natural graphite particle with the amorphous or semi-crystalline carbon precursor and the lithium acetate, and impregnating the amorphous or semi-crystalline carbon precursor and the lithium acetate in the open gap present on the surface part and inside the spherically-shaped natural graphite particle; drying the solution subjected to the ultrasonication to obtain a spherically-shaped natural graphite-modified particle; and heat-treating the spherically-shaped natural graphite-modified particle to prepare a spherically-shaped natural graphite-modified composite particle including amorphous or semi-crystalline carbon and a lithium compound that are coated on the surface of the spherically-shaped natural graphite particle and that are present in the open gap present on the surface part and inside the spherically-shaped natural graphite particle, wherein the lithium compound includes $Li_2O$, $Li_2CO_3$, or a combination thereof.

Still another embodiment provides a method of preparing a negative active material for a rechargeable lithium battery that includes: preparing a solution including a spherically-shaped natural graphite particle where flake-shaped natural graphite fragments build up and assemble into a cabbage or random shape, an amorphous or semi-crystalline carbon precursor, and a solvent; performing ultrasonication on the solution, opening between the flake-shaped natural graphite fragments of the surface part and inside the spherically-shaped natural graphite particle to form an open gap while maintaining crystallinity of the spherically-shaped natural graphite particle, and simultaneously coating the surface of the spherically-shaped natural graphite particle with the amorphous or semi-crystalline carbon precursor and impregnating the amorphous or semi-crystalline carbon precursor in the open gap present on the surface part and inside the spherically-shaped natural graphite particle; drying the solution subjected to the ultrasonication after adding lithium acetate thereto to obtain a spherically-shaped natural graphite-modified particle including the amorphous or semi-crystalline carbon precursor and the lithium acetate that are coated on the surface of the spherically-shaped natural graphite particle and that are impregnated in the open gap present on the surface part and inside the spherically-shaped natural graphite particle; and heat-treating the spherically-shaped natural graphite-modified particle to prepare a spherically-shaped natural graphite-modified composite particle including amorphous or semi-crystalline carbon and a lithium compound that are coated on the surface of the spherically-shaped natural graphite particle and that are present in the open gap present on the surface part and inside the spherically-shaped natural graphite particle, wherein the lithium compound includes $Li_2O$, $Li_2CO_3$, or a combination thereof.

The amorphous or semi-crystalline carbon precursor may include citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), sulfonated EPDM, starch, a phenolic resin, a furan resin, furfuryl alcohol, polyacrylic acid, sodium polyacrylate, polyacrylonitrile, polyimide, an epoxy resin, cellulose, styrene, polyvinyl alcohol, polyvinylchloride, coal-based pitch, petroleum-based pitch, mesophase pitch, low molecular weight heavy oil, glucose, gelatin, saccharides, or a combination thereof.

The ultrasonication may be performed by radiating ultrasonic waves at an oscillating frequency of about 10 to about 35 kHz with power of about 10 to about 100 W for about 1 minute to about 24 hours The drying may be performed using at least one spray dry method selected from rotary spray, nozzle spray, and ultrasonic wave spray methods; a drying method using a rotary evaporator; a vacuum-dry method; a natural drying method; or a combination thereof.

The heat treating may be performed at a temperature of about 500 to about 2500° C.

The amorphous or semi-crystalline carbon precursor may be included in an amount of about 2 to about 80 parts by weight based on 100 parts by weight of the spherically-shaped natural graphite particle.

The lithium acetate may be included in an amount of about 0.1 to about 20 parts by weight based on 100 parts by weight of the spherically-shaped natural graphite particle.

Yet another embodiment provides a rechargeable lithium battery including the negative electrode including the negative active material, a positive electrode, and an electrolyte solution.

Other embodiments are included in the following detailed description.

A rechargeable lithium battery having improved high-rate charge and discharge characteristics and cycle-life characteristics may be realized.

DETAILED DESCRIPTION

Hereinafter, embodiments are described in detail. However, these embodiments are exemplary, and this disclosure is not limited thereto.

Figure 1:
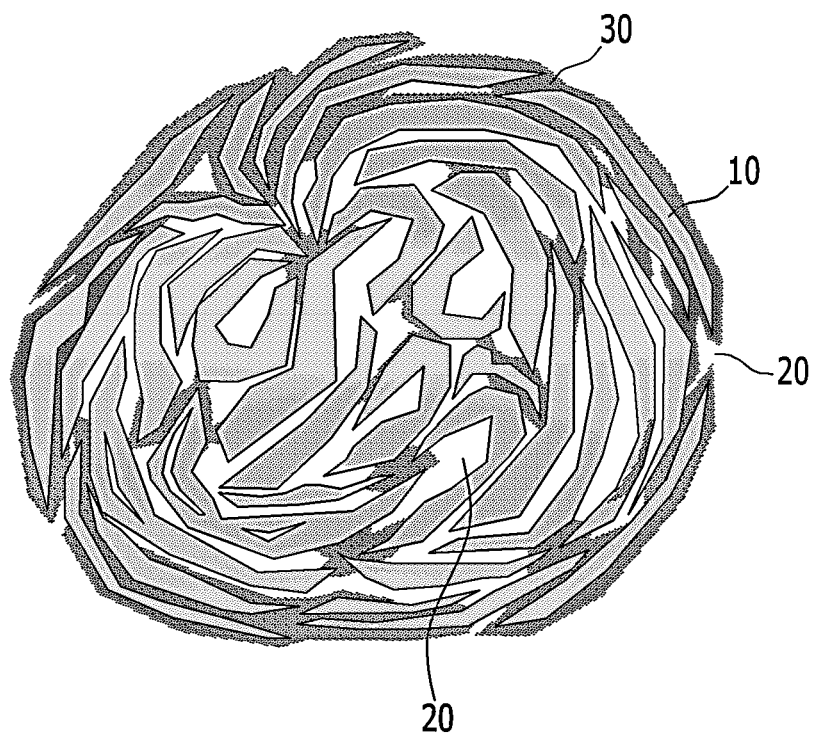
FIG. 1 is a schematic cross-sectional view showing a negative active material according to one embodiment.

A negative active material according to one embodiment is described referred to FIG. 1.

FIG. 1 is a schematic cross-sectional view of a negative active material according to one embodiment.

Referring to FIG. 1, a negative active material according to one embodiment includes a spherically-shaped natural graphite modify composite particle. The spherically-shaped natural graphite modify composite particle 100 may include a spherically-shaped natural graphite particle where flake-shaped natural graphite fragments 10 build up and assemble into a cabbage or random shape, and amorphous or semi-crystalline carbon 30. Specifically, an open gap 20 is present on a surface part and inside the spherically-shaped natural graphite particle, and the open gap 20 may be formed by the post-described method of preparing the negative active material, specifically, opening spaces between the flake-shaped natural graphite fragments 10 through ultrasonication of a solution. Herein, the spherically-shaped natural graphite particle may maintain crystallinity when the open gap is formed by performing ultrasonication on the solution. In addition, the amorphous or semi-crystalline carbon 30 may be coated on the surface of the spherically-shaped natural graphite particle, or may be present in the open gap 20 on the surface part and inside the spherically-shaped natural graphite particle. The amorphous or semi-crystalline carbon is coated on the surface of the spherically-shaped natural graphite particle and is present in the open gap formed on the surface part and inside the spherically-shaped natural graphite particle, and thus may maintain the structure of the open gap and bond the flake-shaped natural graphite fragments with each other, which consist of the spherically-shaped natural graphite particle.

In one embodiment, the "gap" in the spherically-shaped natural graphite particle is different from a "void". The "gap" indicates an empty space formed when flake-shaped natural graphite fragments build up and spaces between flake-shaped natural graphite fragments become open during assembly of the spherically-shaped natural graphite particle without changing its crystallinity. On the other hand, the "void (or cavity)" indicates an empty space formed as a structural defect of crystalline graphite inside of the crystalline graphite particle including natural graphite by a strong external force, and specifically, a milling process and the like applying a stronger external force than ultrasonication, and thus changes the crystallinity of the graphite particle.

According to one embodiment, when a spherically-shaped natural graphite-modified composite particle has the above-described structure, the spherically-shaped natural graphite-modified composite particle may have improved reactivity with an electrolyte solution and thus realize a rechargeable lithium battery having excellent high-rate charge and discharge characteristics and cycle-life characteristics.

Specifically, since the amorphous or semi-crystalline carbon is coated on the surface of the spherically-shaped natural graphite particle and is simultaneously present in an open gap formed on the surface part and inside the spherically-shaped natural graphite particle, the spherically-shaped natural graphite particle may be suppressed from compression during a compression process for preparing a negative electrode and maintain the open gap formed through ultrasonication. Accordingly, the spherically-shaped natural graphite-modified composite particle may have excellent reactivity with an electrolyte solution and thus improve high-rate charge and discharge characteristics of a rechargeable lithium battery.

In addition, the amorphous or semi-crystalline carbon is coated on the surface of the spherically-shaped natural graphite particle and is present in the open gap formed on the surface part and inside the spherically-shaped natural graphite particle, and thus bonds flake-shaped natural graphite fragments with each other and resultantly may suppress deterioration of structural stability of the spherically-shaped natural graphite particle during repeated charges and discharges and improve cycle characteristics of the rechargeable lithium battery.

The amorphous or semi-crystalline carbon may be present in the open gap present inside as well as the open gap present on the surface part of the spherically-shaped natural graphite particle. Herein, the amorphous or semi-crystalline carbon may be present deep inside the open gap, that is, in or around the center of the spherically-shaped natural graphite particle, and this structure may further contribute to improvement of structural stability of the spherically-shaped natural graphite particle during the charge and discharge.

The spherically-shaped natural graphite particle may be formed according to the methods suggested in Korean Patent Laid-Open Publication Nos. 2003-0087986 and 2005-0009245, without limitation. For example, a flake-shaped natural graphite having an average particle diameter of greater than or equal to about 30 μm is assembled and ultimately manufactured into a spherically-shaped natural graphite particle by pulverization through contact between the inside of the rotary processor and the flake-shaped natural graphite powders, a friction process between powders, a shear process of the powder by a shear stress, and the like by a repeated process with a rotary processor.

In this way, the spherically-shaped natural graphite particle may be formed by building up the flake-shaped natural graphite fragments into a cabbage or random shape and assembling them. In addition, the spherically-shaped natural graphite particle may have a circular or oval shape, and specifically, a spherical shape having an index obtained by projecting a three-dimensional natural graphite particle on a two dimensional plane of greater than or equal to about 0.8.

The spherically-shaped natural graphite particle may have an average particle diameter (D50) ranging from about 5 to about 40 μm, and specifically about 7 to about 30 μm. The D50 denotes an average particle diameter corresponding to 50 volume % of a cumulative volume in a particle distribution. When the spherically-shaped natural graphite particle has an average particle diameter within the range, the flake-shaped natural graphite fragments may build up and be easily assembled into a cabbage or random shape, and thus improve electrochemical characteristics.

The amorphous or semi-crystalline carbon may be included in an amount of about 1 to about 20 parts by weight, and specifically about 2 to about 15 parts by weight, based on 100 parts by weight of the spherically-shaped natural graphite particle. When the amorphous or semi-crystalline carbon is coated on the surface of the spherically-shaped natural graphite particle or is present in an open gap on the surface part and inside of the spherically-shaped natural graphite particle within the amount range, the open gap between the flake-shaped natural graphite fragments formed on the surface part and inside of the spherically-shaped natural graphite particle may be appropriately maintained.

The spherically-shaped natural graphite-modified composite particle may further include a lithium compound in addition to the spherically-shaped natural graphite particle and the amorphous or semi-crystalline carbon. Specifically, the lithium compound along with the amorphous or semi-crystalline carbon may be coated on the surface of the spherically-shaped natural graphite particle, and is also present in the open gap on the surface part and inside of the spherically-shaped natural graphite particle.

The lithium compound may include $Li_2O$, $Li_2CO_3$, or a combination thereof. The lithium compound may be formed by using lithium acetate. Specifically, the lithium acetate may be decomposed into $Li_2CO_3$ and further decomposed into $Li_2O$ by a heat treatment.

On the other hand, the spherically-shaped natural graphite particle basically indicates a hexagonal graphite structure in which graphitic layer planes are laminated in a c-axis direction in a way of ABAB . . . but may include a rhombohedral graphite structure in which the graphitic layer planes are laminated in a way of ABCABC . . . which is partially changed from the way of ABAB . . . The rhombohedral graphite structure as a structural defect may increase disordering of the graphite structure and thus suppress intercalation and deintercalation of lithium during charge and discharge and lead an irreversible reaction. This rhombohedral graphite structure is less thermally stable than the hexagonal graphite structure and thus may be removed when heat-treated at higher than or equal to about 2000° C. However, the heat treatment at the above temperature may be expensive. According to one embodiment, when the spherically-shaped natural graphite-modified composite particle further includes the lithium compound, lithium acetate reacts with a spherically-shaped natural graphite particle during a heat treatment while manufacturing the spherically-shaped natural graphite-modified composite particle, and thus the rhombohedral graphite structure may be easily removed at a relatively low temperature of about 1200° C., improving initial charge and discharge efficiency and cycle-life characteristics.

The lithium compound may be included in an amount of about 0.01 to about 10 parts by weight, and specifically about 0.1 to about 5 parts by weight, based on 100 parts by weight of the spherically-shaped natural graphite particle. When the lithium compound is included within the amount range, the lithium acetate sufficiently reacts with flake-shaped natural graphite particles consisting of the spherically-shaped natural graphite particle and effectively removes a rhombohedral graphite structural defect in the flake-shaped natural graphite particles, and thus may improve initial charge and discharge characteristics and charge and discharge cycle characteristics.

The above negative active material may be manufactured in the following method.

The above spherically-shaped natural graphite-modified composite particle may be prepared by a method including preparing a solution including a spherically-shaped natural graphite particle, an amorphous or semi-crystalline carbon precursor, and a solvent, performing ultrasonication on the solution, drying the solution subjected to the ultrasonication to obtain a spherically-shaped natural graphite-modified particle, and heat-treating the spherically-shaped natural graphite-modified particle.

Specifically, the spherically-shaped natural graphite particle may include a particle assembled by building up the above-described flake-shaped natural graphite fragments into a cabbage or random shape.

The amorphous or semi-crystalline carbon precursor may include citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, ethylene-propylene-diene monomer (EPDM), sulfonated EPDM, starch, a phenolic resin, a furan resin, furfuryl alcohol, polyacrylic acid, sodium polyacrylate, polyacrylonitrile, polyimide, an epoxy resin, cellulose, styrene, polyvinyl alcohol, polyvinylchloride, coal-based pitch, petroleum-based pitch, mesophase pitch, a low molecular weight heavy oil, glucose, gelatin, saccharides, or a combination thereof.

The amorphous or semi-crystalline carbon precursor may be included in an amount of about 2 to about 80 parts by weight, and specifically about 5 to about 50 parts by weight, based on 100 parts by weight of the spherically-shaped natural graphite particle. When the amorphous or semi-crystalline carbon precursor is included within the range, an open gap between the flake-shaped natural graphite fragments on the surface part and inside of the spherically-shaped natural graphite particle may be appropriately maintained.

The solvent may include water, N-methylpyrrolidone, dimethylformamide, toluene, ethylene, dimethylacetamide, acetone, methylethylketone, hexane, tetrahydrofuran, decane, ethanol, methanol, isopropanol, ethyl acetate, or a combination thereof.

The ultrasonication of the solution opens areas between flake-shaped natural graphite fragments that are to build up during manufacture of the spherically-shaped natural graphite particle as well as maintain crystallinity of the spherically-shaped natural graphite particle. In this way, through ultrasonication, the open gap is formed and simultaneously the surface of the spherically-shaped natural graphite particle is coated with the amorphous or semi-crystalline carbon precursor and the amorphous or semi-crystalline carbon precursor is impregnated in the open gap present on the surface part and inside the spherically-shaped natural graphite particle.

The ultrasonication may be performed under the following conditions.

The ultrasonication may be performed by radiating ultrasonic waves at an oscillating frequency of about 10 to about 35 kHz with power of about 10 to about 100 W for about 1 minute to about 24 hours. The oscillating frequency may specifically be in a range of about 20 to about 35 kHz, and more specifically about 20 to about 30 kHz, the power may specifically be in a range of about 15 to about 70 W, and more specifically about 20 to about 60 W, and the radiation time may specifically be in a range of about 5 minutes to 10 hours, and more specifically about 10 minutes to about 2 hours. When the ultrasonic waves are radiated within the condition ranges, the spherically-shaped natural graphite particle may not only maintain crystallinity of the graphite, but an open gap may also be formed between flake-shaped natural graphite fragments on the surface part and inside of the spherically-shaped natural graphite particle.

The solution subjected to the ultrasonication may be dried using at least one spray dry method selected from rotary spray, nozzle spray, and ultrasonic wave spray methods; a drying method using a rotary evaporator; a vacuum-dry method; a natural drying method; or a combination thereof.

The spherically-shaped natural graphite-modified particle may be heat-treated at a temperature of about 500 to about 2500° C., specifically about 500 to about 2000° C., and more specifically about 900 to about 1500° C. When the heat treatment is performed within the temperature range, heterogeneous elements as impurities may be sufficiently removed during carbonization of the amorphous or semi-crystalline carbon precursor, decreasing irreversible capacity and improving charge and discharge characteristics.

The heat treatment may be performed under an atmosphere including nitrogen, argon, hydrogen, or a mixed gas thereof, or under vacuum.

The heat treatment may carbonize the amorphous or semi-crystalline carbon precursor in the open gap between the flake-shaped natural graphite fragments and on the surface of the spherically-shaped natural graphite, so that the amorphous or semi-crystalline carbon may be coated on the surface of the spherically-shaped natural graphite particle and be present in the open gap on the surface part and inside of the spherically-shaped natural graphite particle.

When this spherically-shaped natural graphite-modified composite particle is used as a negative active material, the negative active material shows improved reactivity with an electrolyte solution, and may realize a rechargeable lithium battery having excellent high-rate charge and discharge characteristics and cycle-life characteristics.

Specifically, when a spherically-shaped natural graphite particle as a negative active material is used to manufacture a negative electrode, the spherically-shaped natural graphite particle may be compressed during a compression process. In particular, when the ultrasonication forms an open gap between flake-shaped natural graphite fragments of the spherically-shaped natural graphite particle, the compression may be largely aggravated. However, according to one embodiment, since the amorphous or semi-crystalline carbon precursor is impregnated in the open gap between the flake-shaped natural graphite fragments and coated on the surface of the spherically-shaped natural graphite during ultrasonication and then the amorphous or semi-crystalline carbon is present in the open gap formed on the surface part and inside of the spherically-shaped natural graphite particle as well as coated on the surface of the spherically-shaped natural graphite particle through heat treatment, the spherically-shaped natural graphite particle is suppressed from compression and may maintain the open gap formed through the ultrasonication. Accordingly, the spherically-shaped natural graphite particle has excellent reactivity with an electrolyte solution and may improve high-rate charge and discharge characteristics of a rechargeable lithium battery.

On the other hand, since repeated expansions and contractions of graphite are difficult to effectively buffer due to repeated intercalation and deintercalation of lithium during charge and discharge, flake-shaped natural graphite fragments consisting of the spherically-shaped natural graphite particle may build up loosely and deteriorate structural stability of the spherically-shaped natural graphite particle. In one embodiment, the amorphous or semi-crystalline carbon is coated on the surface of the spherically-shaped natural graphite particle and present in the open gap on the surface part and inside of the spherically-shaped natural graphite particle, and thus may bond the flake-shaped natural graphite fragments of the spherically-shaped natural graphite particle. Accordingly, the deterioration of structural stability of the spherically-shaped natural graphite particle that may be generated by repeated expansion and contraction of graphite due to intercalation and deintercalation of lithium during charge and discharge may be suppressed, and thus cycle characteristics may be improved.

The spherically-shaped natural graphite-modified composite particle further including the lithium compound in addition to the spherically-shaped natural graphite particle and the amorphous or semi-crystalline carbon may be manufactured as follows.

As a first method, the spherically-shaped natural graphite-modified composite particle may be prepared by a method including preparing a solution including a spherically-shaped natural graphite particle, an amorphous or semi-crystalline carbon precursor, lithium acetate, and a solvent, performing ultrasonication on the solution, drying the solution subjected to the ultrasonication to obtain a spherically-shaped natural graphite-modified particle, and heat-treating the spherically-shaped natural graphite-modified particle.

Through ultrasonication of the solution, the flake-shaped natural graphite fragments on the surface part and inside the spherically-shaped natural graphite particle are opened to form an open gap while maintaining crystallinity of the spherically-shaped natural graphite particle, and simultaneously the surface of the spherically-shaped natural graphite particle is coated with the amorphous or semi-crystalline carbon precursor and the lithium acetate, and the amorphous or semi-crystalline carbon precursor and the lithium acetate are impregnated in the open gap present on the surface part and inside the spherically-shaped natural graphite particle.

Through heat-treating the spherically-shaped natural graphite-modified particle, the amorphous or semi-crystalline carbon precursor in the open gaps between the flake-shaped natural graphite fragments and on the surface of the spherically-shaped natural graphite particle is carbonized and the lithium acetate is decomposed, and thereby the amorphous or semi-crystalline carbon and lithium compound are coated on the surface of the spherically-shaped natural graphite particle together and the amorphous or semi-crystalline carbon and lithium compound are present in the open gap present on the surface part and inside the spherically-shaped natural graphite particle together.

In the method of manufacturing the spherically-shaped natural graphite modify composite particle further including a lithium compound, the kind and amount of the spherically-shaped natural graphite particle and the amorphous or semi-crystalline carbon precursor, the conditions of the ultrasonic waves, and the conditions of the drying and the heat treatment are all the same as above.

As a second method, the spherically-shaped natural graphite-modified composite particle may be prepared by a method including preparing a solution including a spherically-shaped natural graphite particle, an amorphous or semi-crystalline carbon precursor, and a solvent, performing ultrasonication on the solution, drying the solution subjected to the ultrasonication after adding lithium acetate thereto to obtain a spherically-shaped natural graphite-modified particle, and heat-treating the spherically-shaped natural graphite-modified particle.

Through ultrasonication of the solution, the flake-shaped natural graphite fragments on the surface part and inside the spherically-shaped natural graphite particle are opened to form an open gap while maintaining crystallinity of the spherically-shaped natural graphite particle, and simultaneously the surface of the spherically-shaped natural graphite particle is coated with the amorphous or semi-crystalline carbon precursor and the amorphous or semi-crystalline carbon precursor may be impregnated in the open gap present on the surface part and inside the spherically-shaped natural graphite particle.

Through drying the solution subjected to the ultrasonication after adding lithium acetate thereto, the surface of the spherically-shaped natural graphite particle is coated with the amorphous or semi-crystalline carbon precursor and the lithium acetate, and the amorphous or semi-crystalline carbon precursor and the lithium acetate are impregnated in the open gap present on the surface part and inside the spherically-shaped natural graphite particle.

Through heat-treating the spherically-shaped natural graphite-modified particle, the amorphous or semi-crystalline carbon precursor in the open gaps between the flake-shaped natural graphite fragments and on the surface of the spherically-shaped natural graphite particle is carbonized and the lithium acetate is decomposed, and thereby the amorphous or semi-crystalline carbon and lithium compound are coated on the surface of the spherically-shaped natural graphite particle together and the amorphous or semi-crystalline carbon and lithium compound are present in the open gap present on the surface part and inside the spherically-shaped natural graphite particle together.

In the first and second methods, the lithium acetate may be included in an amount of about 0.1 to about 20 parts by weight, and specifically about 0.1 to about 15 parts by weight, based on 100 parts by weight of the spherically-shaped natural graphite particle. When the lithium acetate is included within the amount range, the lithium acetate sufficiently reacts with a flake-shaped natural graphite particle consisting of the spherically-shaped natural graphite particle, and thus may remove a rhombohedral graphite structural defect in the flake-shaped natural graphite particle and improve initial charge and discharge characteristics and charge and discharge cycle characteristics.

Likewise, in the second method of manufacturing the spherically-shaped natural graphite-modified composite particle further including a lithium compound, the kind and amount of the spherically-shaped natural graphite particle and the amorphous or semi-crystalline carbon precursor, the conditions of the ultrasonic waves, and the heat treatment are all the same as above.

According to another embodiment, a rechargeable lithium battery including a negative electrode including the above negative active material, a positive electrode, and an electrolyte solution is provided.

A rechargeable lithium battery may be classified as a lithium ion battery, a lithium ion polymer battery, or a lithium polymer battery according to the presence of a separator and the kind of electrolyte used in the battery. The rechargeable lithium battery may also be classified as cylindrical, prismatic, coin-type, or pouch-type batteries according to shapes, and may be classified as a thin film or bulk battery. Structures and preparation methods for lithium ion batteries pertaining to this disclosure are well known in the art.

The negative electrode may be manufactured by mixing the above-described negative active material, a binder, and optionally a conductive material to prepare a composition for a negative active material layer, and applying the composition on a negative current collector. The structure of the negative electrode is well known in this art, and thus detailed descriptions thereof are omitted.

The following examples illustrate the present invention in more detail. However, the following examples are exemplary and the present invention is not limited to the examples.

Preparation of Negative Active Material

Example 1

A spherically-shaped natural graphite-modified particle is manufactured by adding 2.5 parts by weight of a spherically-shaped natural graphite particle having an average particle diameter (D50) of 12.5 μm (SNG12, Posco Chemtech) and 0.23 parts by weight of petroleum-based pitch (yield after carbonization of 5 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator and simultaneously radiating ultrasonic waves thereto at a frequency of 20 kHz and with 25 W of power for 60 minutes, adding 100 parts by weight of distilled water thereto, and rotary spray-drying the mixture at 160° C. after evaporating the tetrahydrofuran with a rotary evaporator. The spherically-shaped natural graphite-modified particle is heat-treated at 1200° C. for 1 hour under an argon atmosphere and then furnace-cooled, manufacturing a spherically-shaped natural graphite-modified composite particle having an average particle diameter (D50) of 16.3 μm.

Example 2

A spherically-shaped natural graphite-modified particle is manufactured by adding 2.5 parts by weight of a spherically-shaped natural graphite particle having an average particle diameter (D50) of 12.5 μm (SNG12, Posco Chemtech) and 0.23 parts by weight of petroleum-based pitch (yield after carbonization of 5 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator and simultaneously radiating ultrasonic waves thereto at a frequency of 20 kHz and with 55 W of power for 10 minutes, adding 100 parts by weight of distilled water thereto, and rotary spray-drying the mixture at 160° C. after evaporating the tetrahydrofuran with a rotary evaporator. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 16 μm.

Example 3

A spherically-shaped natural graphite-modified particle is manufactured by adding 2.5 parts by weight of a spherically-shaped natural graphite particle having an average particle diameter (D50) of 12.5 μm (SNG12, Posco Chemtech) and 0.3 parts by weight of petroleum-based pitch (yield after carbonization of 7 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator and simultaneously radiating ultrasonic waves at a frequency of 20 kHz and with 55 W of power for 60 minutes, adding 100 parts by weight of distilled water thereto, and rotary spray-drying the mixture at 160° C. after evaporating the tetrahydrofuran with a rotary evaporator. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 17.2 μm.

Example 4

A spherically-shaped natural graphite-modified particle is manufactured by adding 2.5 parts by weight of a spherically-shaped natural graphite particle having an average particle diameter (D50) of 12.5 μm (SNG12, Posco Chemtech) and 0.3 parts by weight of petroleum-based pitch (yield after carbonization of 7 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator and simultaneously radiating ultrasonic waves at a frequency of 20 kHz and with under 55 W of power for 60 minutes, adding 100 parts by weight of distilled water thereto, evaporating the tetrahydrofuran with a rotary evaporator, dissolving 0.125 parts of weight of lithium acetate therein, and rotary spray-drying the mixture at 160° C. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 17.1 μm.

Example 5

A spherically-shaped natural graphite-modified particle is manufactured by adding 2.5 parts by weight of a spherically-shaped natural graphite particle having an average particle diameter (D50) of 16 μm (SNG12, Posco Chemtech) and 0.3 parts by weight of petroleum-based pitch (yield after carbonization of 7 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator and simultaneously radiating ultrasonic waves at a frequency of 20 kHz and with 55 W of power for 60 minutes, adding 100 parts by weight of distilled water thereto, and rotary spray-drying the mixture at 160° C. after evaporating the tetrahydrofuran with a rotary evaporator. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 19.5 μm.

Comparative Example 1

A spherically-shaped natural graphite particle having an average particle diameter (D50) of 12.5 μm (SNG12, Pasco Chemtech) is used as a negative active material.

Comparative Example 2

A spherically-shaped natural graphite-modified particle is manufactured by adding 2.5 parts by weight of a spherically-shaped natural graphite particle having an average particle diameter (D50) of 12.5 μm (SNG12, Posco Chemtech) and 0.3 parts by weight of petroleum-based pitch (yield after carbonization of 7 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator for one hour, adding 100 parts by weight of distilled water thereto, and rotary spray-drying the mixture at 160° C. after evaporating the tetrahydrofuran from the mixture with a rotary evaporator. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 16 μm.

Comparative Example 3

A spherically-shaped natural graphite-modified particle is manufactured by adding 2.5 parts by weight of a spherically-shaped natural graphite particle having an average particle diameter (D50) of 16 μm (SNG12, Posco Chemtech) and 0.3 parts by weight of petroleum-based pitch (yield after carbonization of 7 parts by weight of amorphous or semi-crystalline carbon based on 100 parts by weight of the spherically-shaped natural graphite particle) to 100 parts by weight of tetrahydrofuran to prepare a mixed solution, agitating the mixed solution with a magnet agitator for one hour, adding 100 parts by weight of distilled water thereto, and rotary spry-drying the mixture at 160° C. after evaporating the tetrahydrofuran from the mixture with a rotary evaporator. The spherically-shaped natural graphite-modified particle is heat-treated at 1200° C. for 1 hour under an argon atmosphere and furnace-cooled, manufacturing a spherically-shaped natural graphite-modified composite particle having an average particle diameter (D50) of 17 μm.

Evaluation 1

Figure 2:
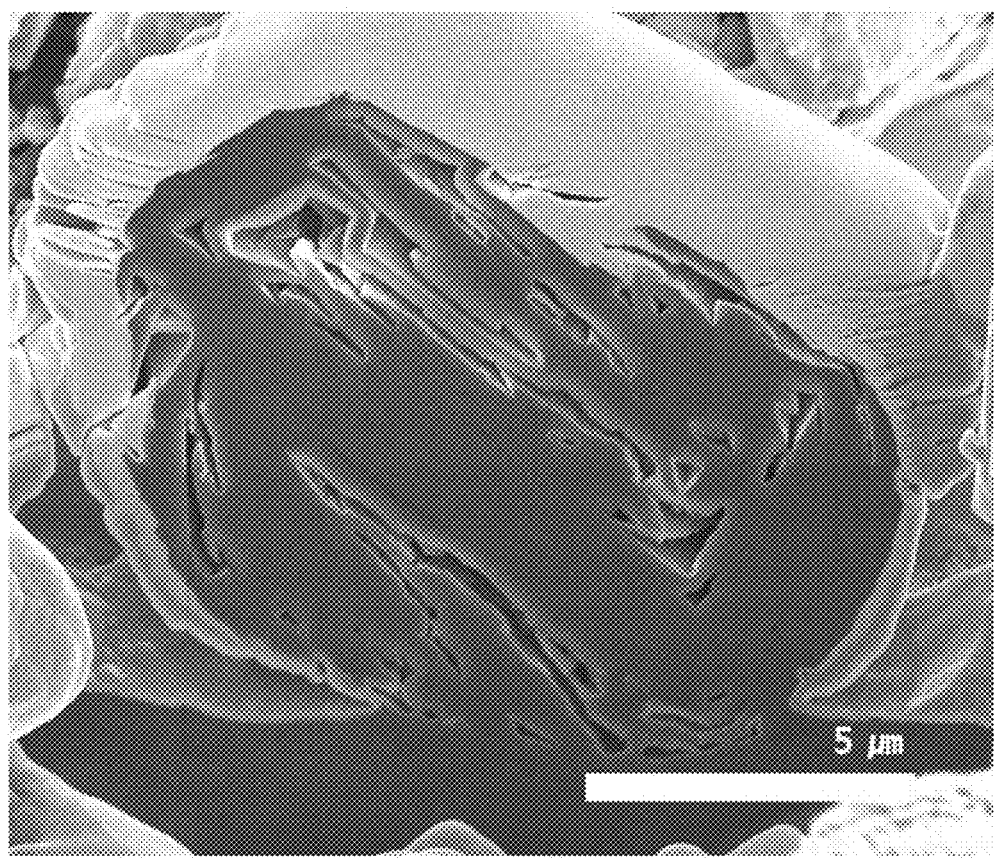
FIGS. 2 and 3 are scanning electron microscope (SEM) photographs respectively showing cross-sectional view of negative active materials according to Example 1 and Comparative Example 1.
Figure 3:
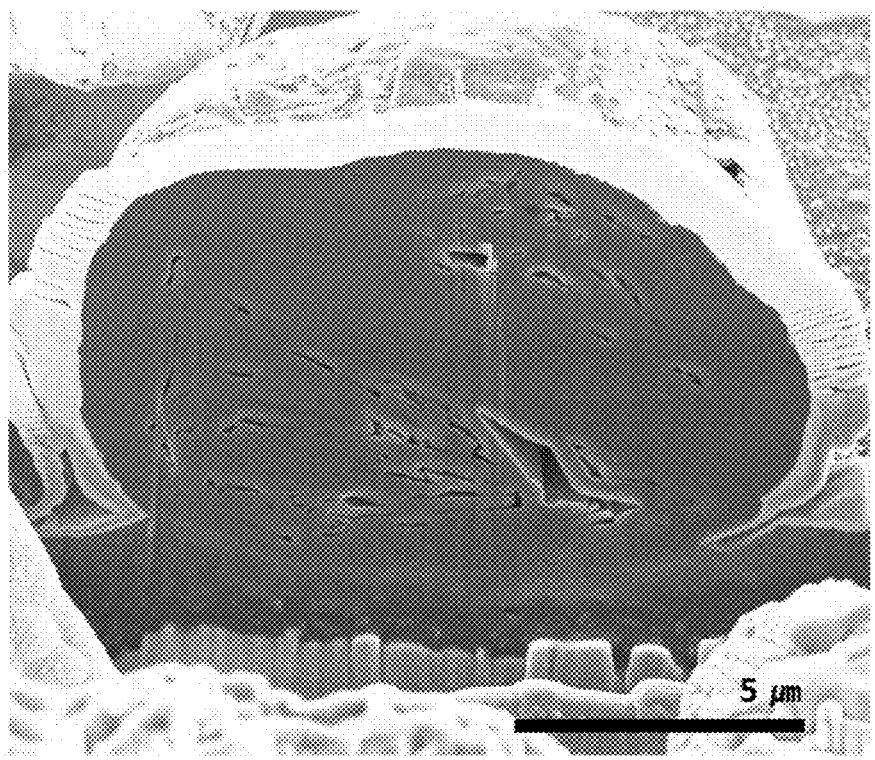
Figure 4:
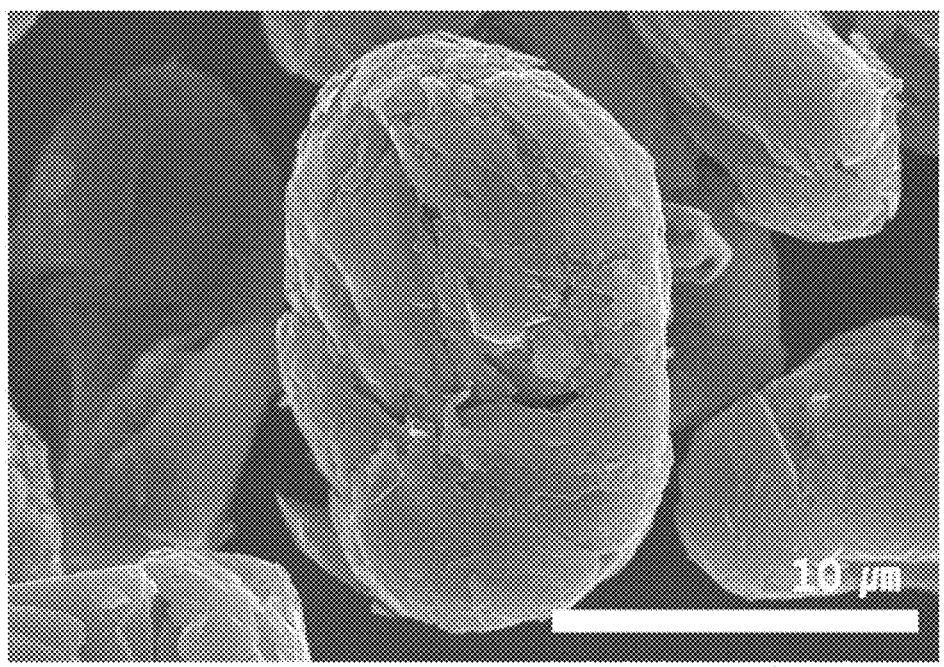
FIGS. 4 to 11 are scanning electron microscope (SEM) photographs respectively showing the negative active materials according to Examples 1 to 5 and Comparative Examples 1 to 3.
Figure 5:
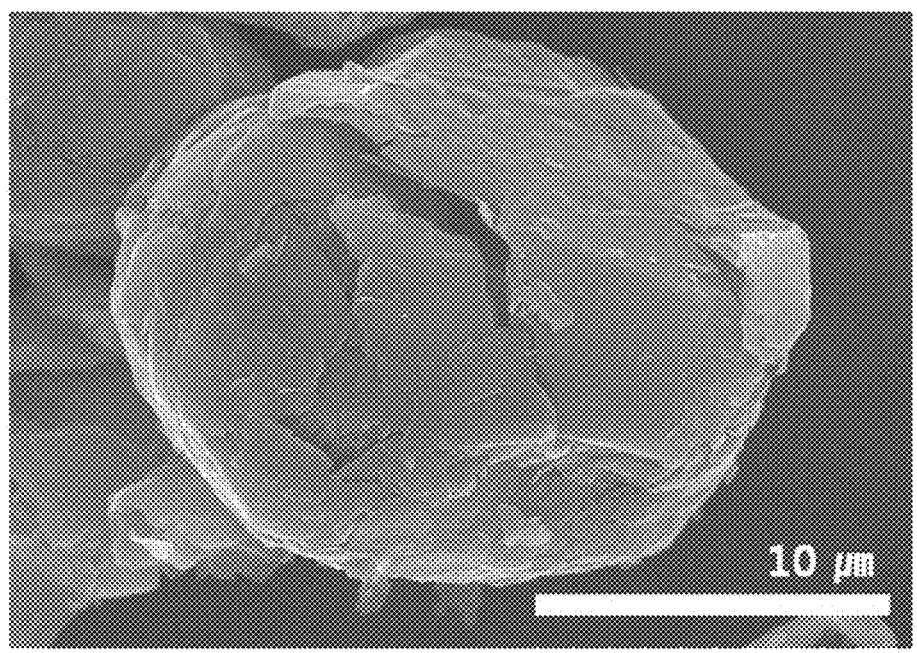
Figure 6:
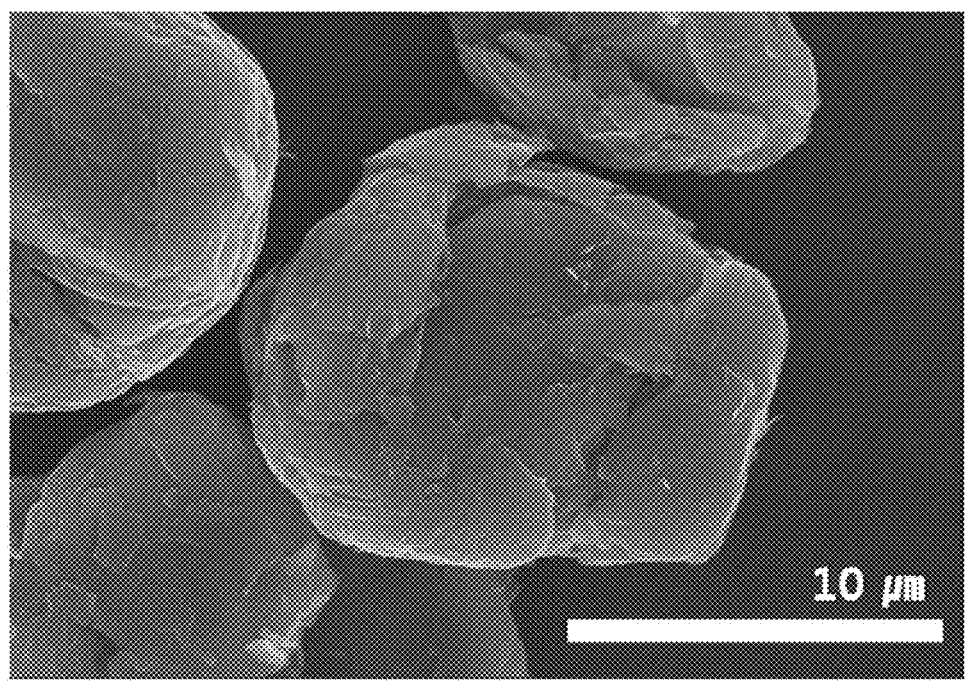
Figure 7:
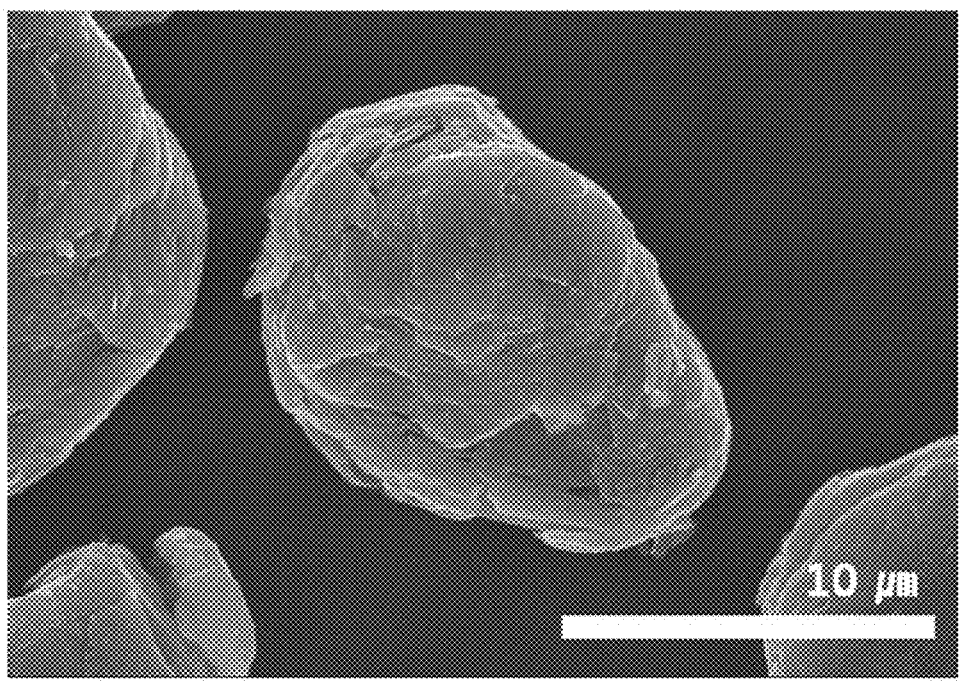
Figure 8:
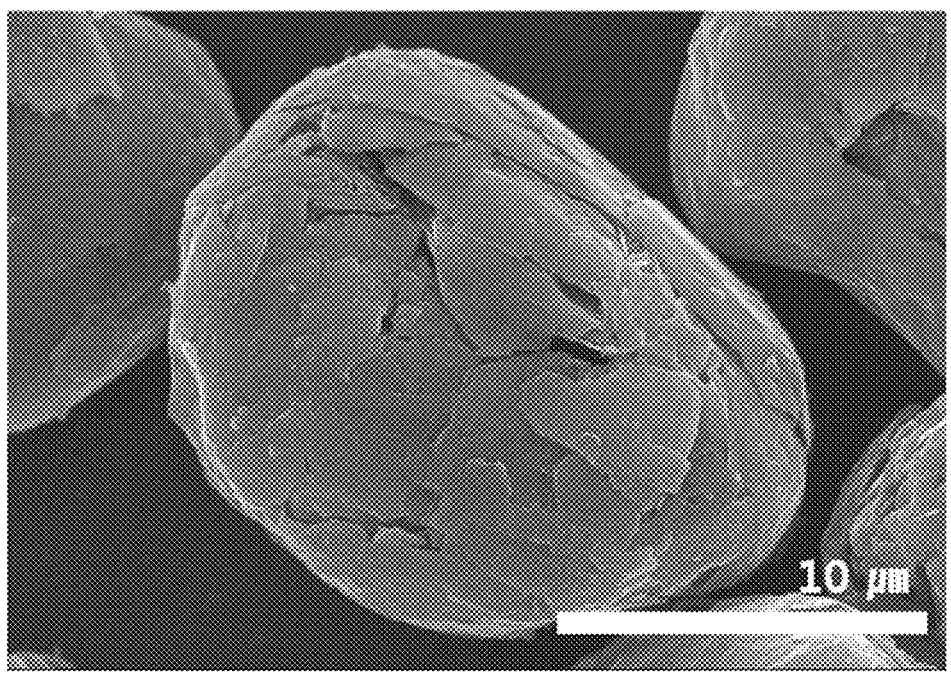
Figure 9:
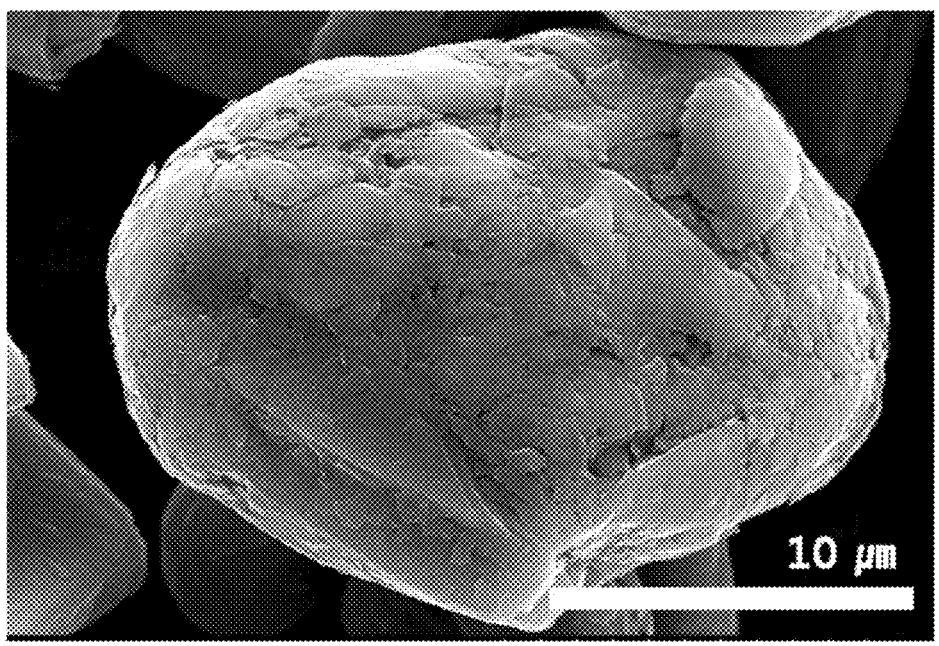
Figure 10:
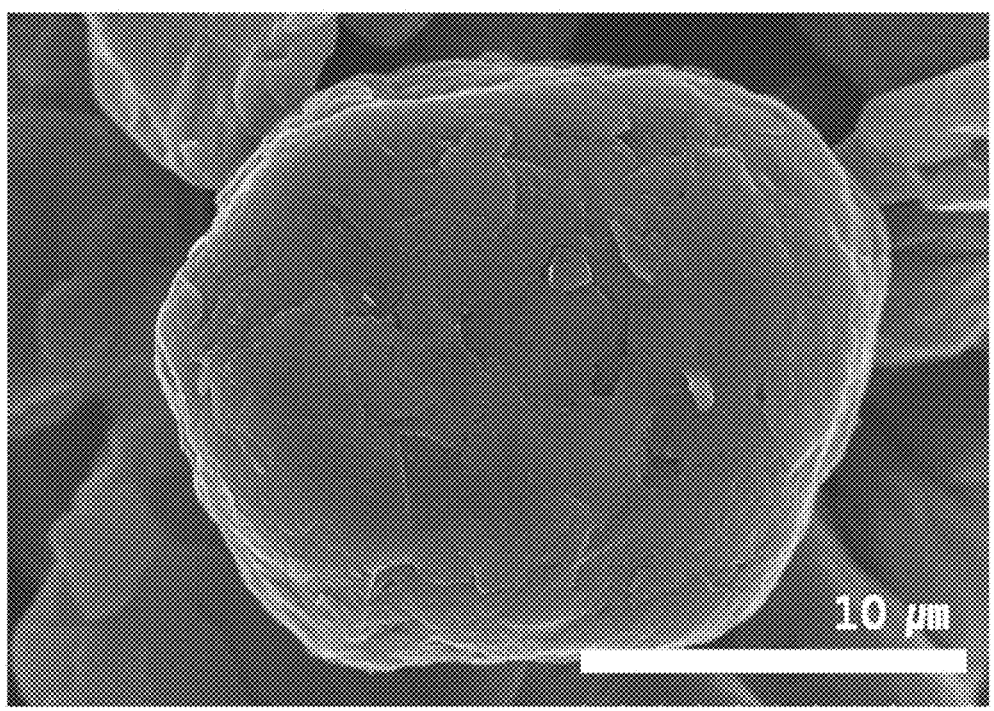
Figure 11:
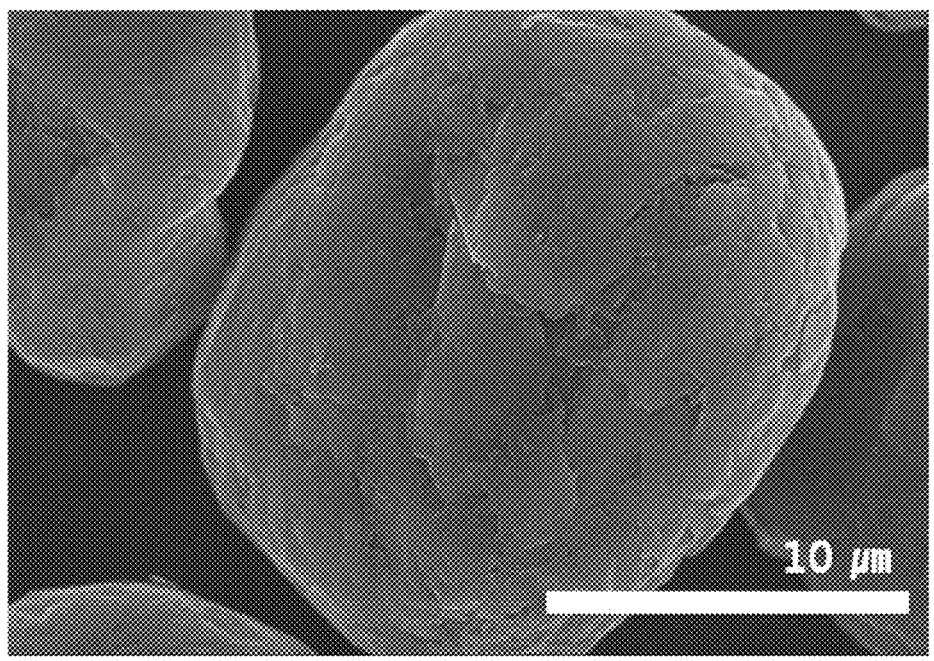

Scanning Electron Microscope (SEM) Photograph Analysis of Negative Active Material FIGS. 2 and 3 are respectively scanning electron microscope (SEM) photographs showing the cross-section of the negative active materials according to Example 1 and Comparative Example 1, and FIGS. 4 to 11 are respectively scanning electron microscope (SEM) photographs showing the negative active materials according to Examples 1 to 5 and Comparative Examples 1 to 3.

Referring to FIG. 2 and FIGS. 4 to 8, the negative active materials according to Examples 1 to 5 are found to have open gaps between flake-shaped natural graphite fragments on the surface part of the spherically-shaped natural graphite particle.

Referring to the cross-sections shown in FIG. 2 and FIG. 3, the negative active material of Example 1 has open gaps between flake-shaped natural graphite fragments inside as well as on the surface part of the spherically-shaped natural graphite particle. The spherically-shaped natural graphite particle of Comparative Example 1 has a gap partly formed inside during the manufacturing process but almost no gap on the surface part, and herein, the gap partly formed inside does not have as much of an open gap as the gap in the ultrasonicated spherically-shaped natural graphite particle of Example 1.

Evaluation 2

Figure 12:
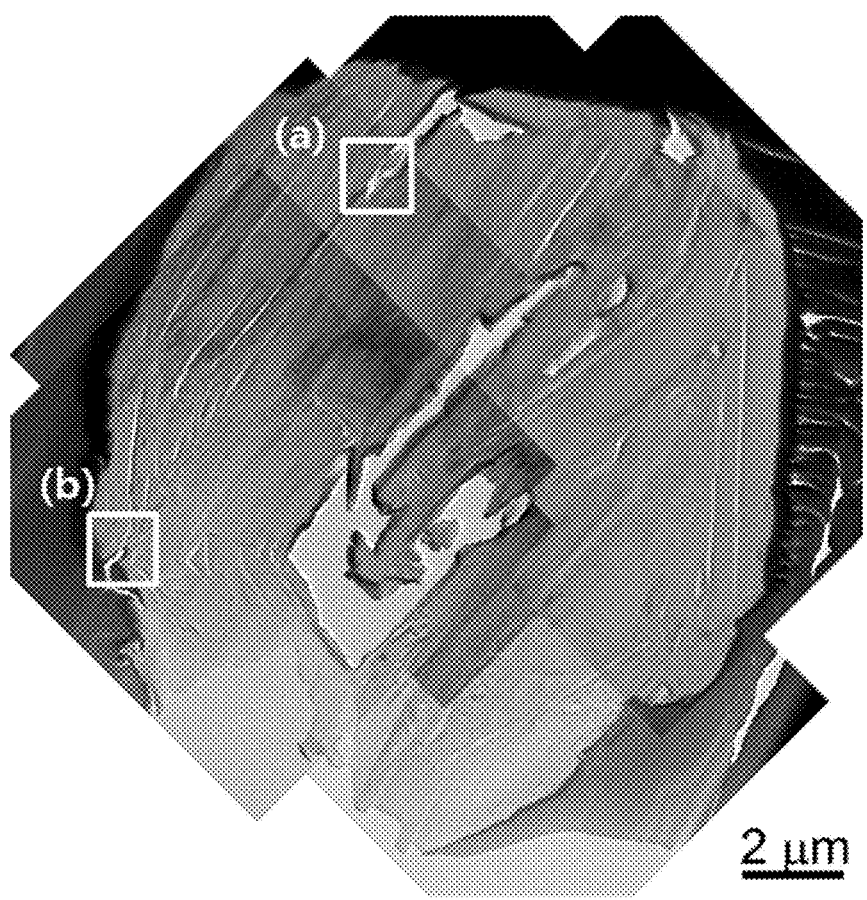
FIG. 12 is a transmission electron microscope (TEM) photograph showing cross-sectional view of negative active materials according to Example 5.
Figure 13:
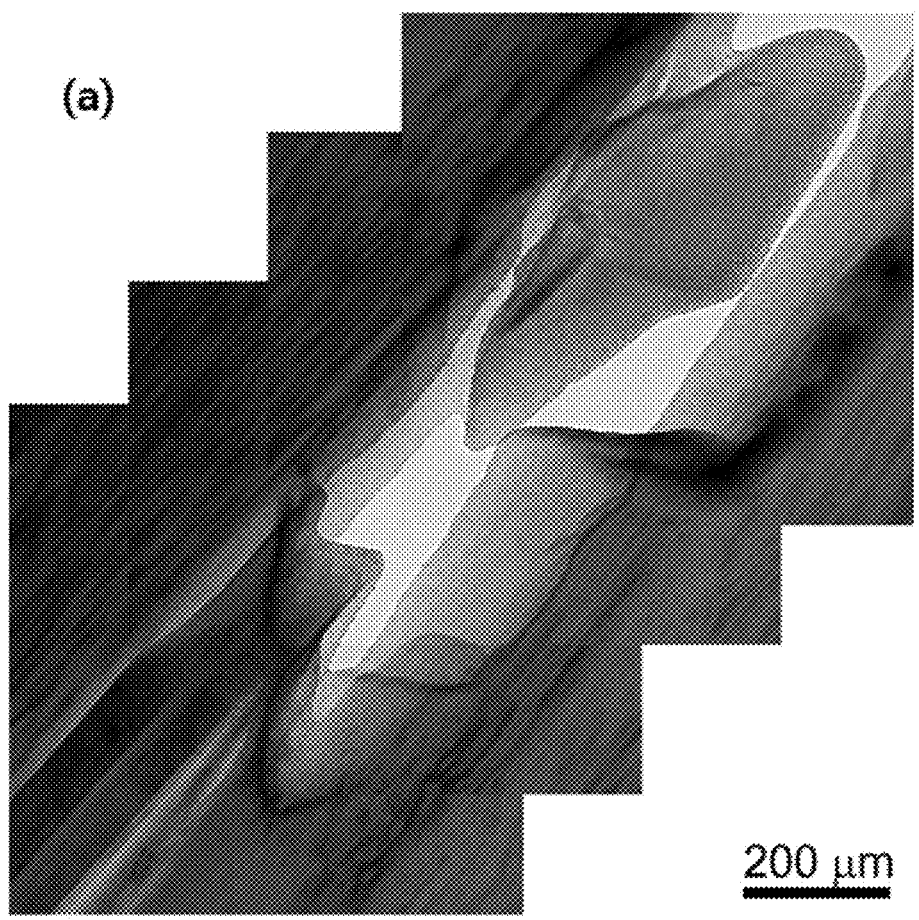
FIGS. 13 and 14 are transmission electron microscope (TEM) photographs respectively showing enlargements of (a) and (b) parts in FIG. 12.
Figure 14:
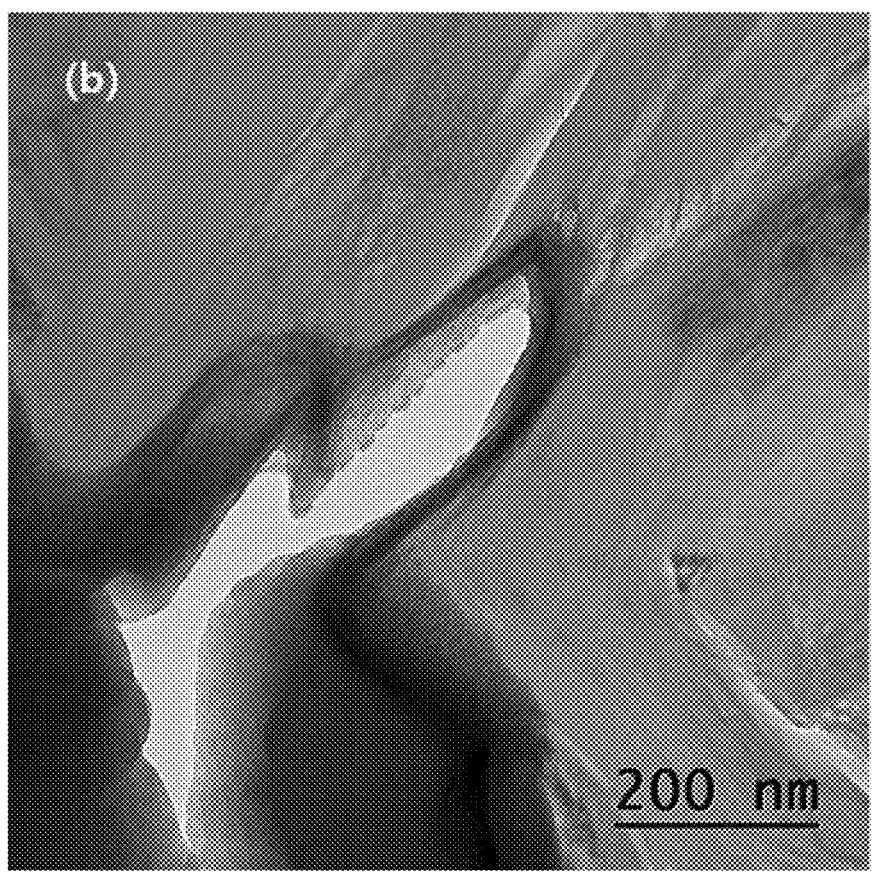

Transmission Electron Microscope (TEM) Photograph Analysis of Negative Active Material FIG. 12 is a transmission electron microscope (TEM) photograph showing cross-sectional view of negative active materials according to Example 5, and FIGS. 13 and 14 are transmission electron microscope (TEM) photographs respectively showing enlargements of (a) and (b) parts in FIG. 12.

Referring to FIGS. 12 to 14, the amorphous or semi-crystalline carbon is present in the open gaps between flake-shaped natural graphite fragments on both the surface part and inside of the spherically-shaped natural graphite particle, which are formed through the ultrasonication.

Evaluation 3

Particle Distribution Analysis of Negative Active Material

Particle distribution of the negative active materials according to Examples 1 to 5 and Comparative Examples 1 to 3 is measured in a laser diffraction-scattering particle distribution measurement method, and average particle diameters (D50) of the negative active materials are provided in the following Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Average particle diameter (D50, μm) | 16.3 | 16 | 17.2 | 17.1 | 19.5 | 12.5 | 15 | 17 |

Referring to Table 1, the ultrasonicated negative active materials according to Examples 1 to 4 show an increased average particle diameter (D50) compared with the non-ultrasonicated negative active material according to Comparative Example 2. In addition, the ultrasonicated negative active material according to Example 5 shows an increased average particle diameter (D50) compared with the non-ultrasonicated negative active material according to Comparative Example 3. The reason is that the ultrasonication opens flake-shaped natural graphite fragments and forms an open gap between them inside and on the surface part of the spherically-shaped natural graphite particle.

Evaluation 4

Specific Surface Area Analysis of Negative Active Material

Specific surface area (BET surface area) of the negative active materials according to Examples 1 to 5 and Comparative Examples 1 to 3 is measured in a gas adsorption/desorption method, and the results are provided in the following Table 2.

TABLE 2

|  | Examples | | | | | Comparative Examples | | |
|---|---|---|---|---|---|---|---|---|
|  | 1 | 2 | 3 | 4 | 5 | 1 | 2 | 3 |
| Specific surface area of negative active material (m²/g) | 9.5 | 7 | 7.5 | 7.2 | 6.2 | 6.7 | 2.8 | 2.7 |

Referring to Table 2, the ultrasonicated negative active materials according to Examples 1 to 4 show an increased specific surface area compared with the non-ultrasonicated but carbon-coated negative active material according to Comparative Example 2. In addition, the ultrasonicated negative active material of Example 5 shows an increased specific surface area compared to the non-ultrasonicated but carbon-coated negative active material of Comparative Example 3. The reason is that the ultrasonication opens and forms an open gap between flake-shaped natural graphite fragments inside and on the surface of the spherically-shaped natural graphite particle.

Evaluation 5

Compression Strength of Negative Active Material

Figure 15:
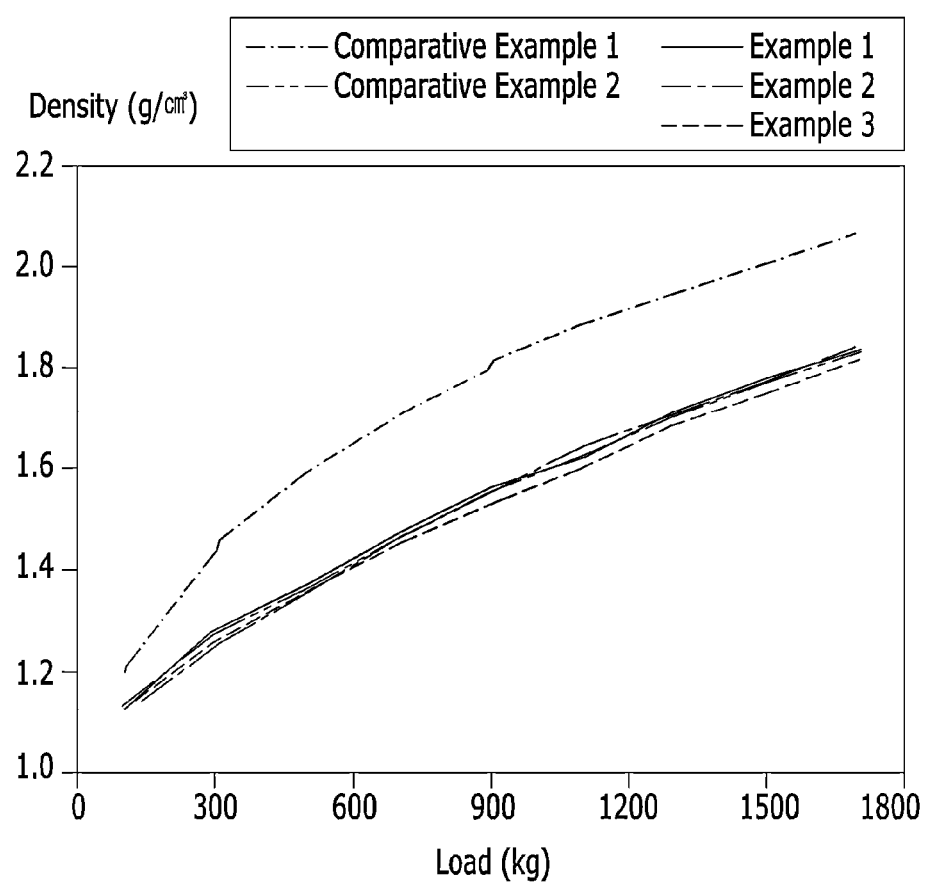
FIG. 15 is a graph showing density of the negative active materials of Examples 1 to 3 and Comparative Examples 1 and 2 relative to a load applied thereon.

Compression strength of the negative active materials according to Examples 1 to 3 and Comparative Examples 1 and 2 is evaluated by measuring density of each manufactured pellet by increasing a load thereon, and the results are provided in FIG. 15.

FIG. 15 is a graph showing density of the negative active materials of Examples 1 to 3 and Comparative Examples 1 and 2 relative to a load applied thereon.

Referring to FIG. 15, Examples 1 to 3 have an open gap formed by opening flake-shaped natural graphite fragments of the spherically-shaped natural graphite particle through ultrasonication, but show no increased density even though compressed with a high load compared with Comparative Example 1. In addition, Examples 1 to 3 show similar compression strength to that of Comparative Example 2.

Accordingly, since an amorphous or semi-crystalline carbon precursor is impregnated in an open gap between the flake-shaped natural graphite fragments and coated on the surface of the spherically-shaped natural graphite during the ultrasonication, and then the amorphous or semi-crystalline carbon is present in an open gap formed on the surface part and inside of the spherically-shaped natural graphite particle and coated on the surface of the spherically-shaped natural graphite particle through the heat-treating, compression of the spherically-shaped natural graphite particle is suppressed and the open gap formed during the ultrasonication is maintained.

Evaluation 6

X-ray Diffraction Pattern Analysis of Negative Active Material

Figure 16:
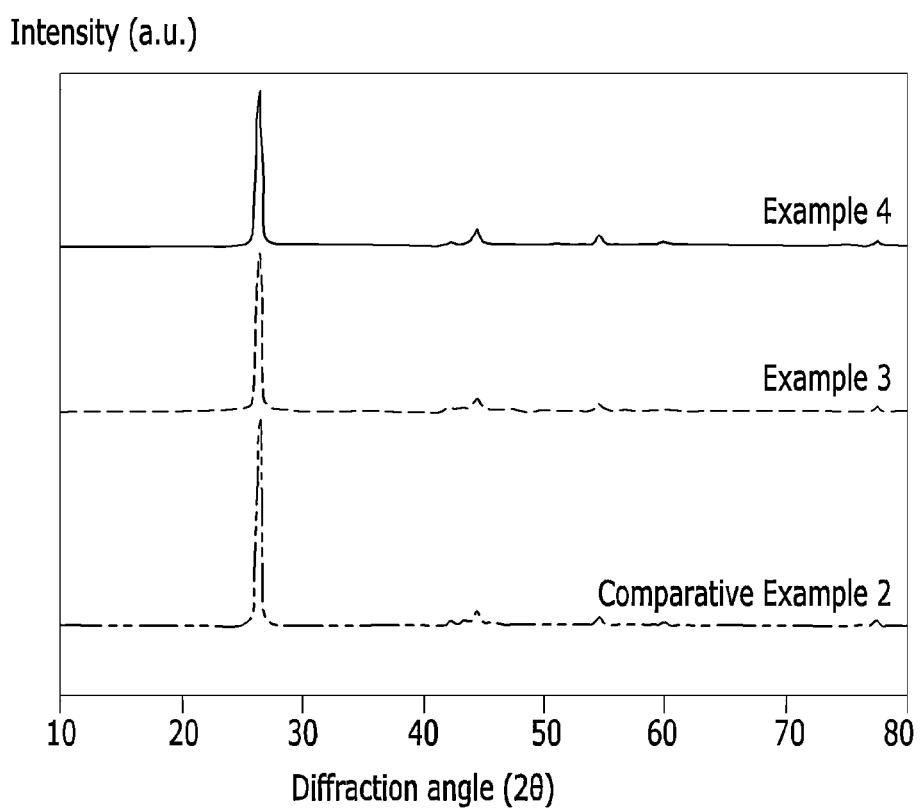
FIG. 16 is a graph showing X-ray diffraction (XRD) patterns of the negative active materials according to Examples 3 and 4 and Comparative Example 2.
Figure 17:
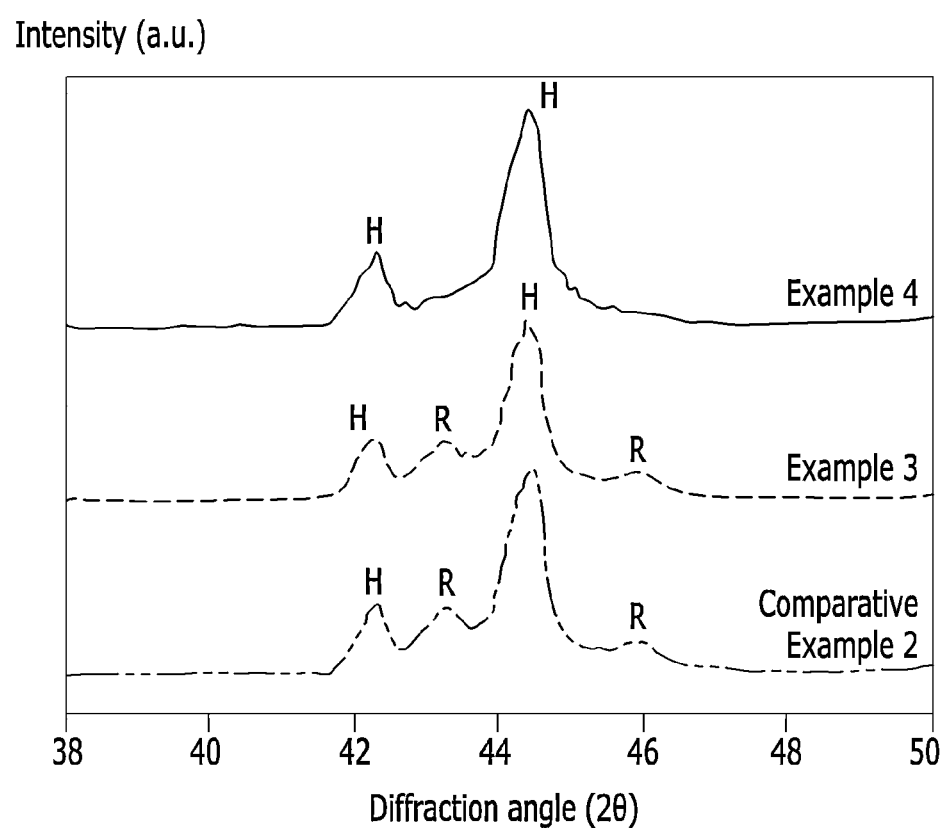
FIG. 17 is a graph enlarging a part of the 2θ section in the X-ray diffraction pattern (XRD) of FIG. 16.

Crystalline of the negative active materials according to Examples 3 and 4 and Comparative Example 2 are measured using an X-ray diffraction pattern analyzer, and the results are provided in FIGS. 16 and 17.

FIG. 16 is a graph showing X-ray diffraction (XRD) patterns of the negative active materials according to Examples 3 and 4 and Comparative Example 2, and FIG. 17 is a graph enlarging a part of the 2θ section in the X-ray diffraction pattern (XRD) of FIG. 16.

Referring to FIGS. 16 and 17, Example 4 including lithium acetate shows no peak having a rhombohedral graphite structure, and the reason is that the lithium acetate react with flake-shaped natural graphite particles of the spherically-shaped natural graphite particle and effectively remove a rhombohedral graphite structural defect in the flake-shaped natural graphite particles.

In addition, La and Lc values are calculated from the X-ray diffraction pattern analysis results of the negative active materials of Examples 3 and 4 and Comparative Example 2, that is, the results in FIG. 16, and are provided in the following Table 3.

La indicates a crystallite size in a direction parallel to a basal plane (an a-axis direction), Lc indicates a crystallite size in a direction perpendicular to the basal plane (an c-axis direction), and the La and Lc are main characteristic factors showing a crystal structure in a carbon material.

TABLE 3

|  | Examples | | | Comparative Examples | |
|---|---|---|---|---|---|
|  | 3 | 4 | 5 | 2 | 3 |
| La (nm) | 20.0 | 20.2 | 22.8 | 20.1 | 22.9 |
| Lc (nm) | 25.3 | 25.5 | 27.9 | 25.4 | 27.8 |

Referring to Table 3, the negative active materials formed through ultrasonication according to Examples 3 and 4 show almost the same La and Lc values as the negative active material manufactured through carbon coating without the ultrasonication according to Comparative Example 2. In addition, the negative active materials formed through ultrasonication according to Example 5 show almost the same La and Lc values as the negative active material manufactured through carbon coating and not through the ultrasonication according to Comparative Example 3. Accordingly, the ultrasonication can be seen to have no influence on crystallinity of the spherically-shaped natural graphite particle.

(Preparation of Test Cell)

96 wt % of each negative active material according to Examples 1 to 5 and Comparative Examples 1 to 3 and 4 wt % of binder obtained by mixing CMC/SBR (carboxylmethyl cellulose/styrene-butadiene rubber) in a weight ratio of 1:1 are mixed in distilled water, preparing each negative electrode slurry. The negative electrode slurry is coated on a copper foil and then dried and compressed, preparing each negative electrode.

Each negative electrode, a lithium metal as a positive electrode, and a separator formed of a porous polypropylene film and interposed between the negative and positive electrodes are used to prepare an electrode assembly. Then, an electrolyte solution prepared by mixing diethyl carbonate (DEC) and ethylene carbonate (EC) (DEC:EC=1:1) and dissolving 1M $LiPF_6$ in the mixed solvent is used with the electrode assembly, preparing a cell for a test.

Evaluation 7

Initial Charge and Discharge Characteristic Analysis of Rechargeable Lithium Battery Cell Initial charge and discharge characteristics of the test cells according to Examples 1 to 5 and Comparative Examples 1 to 3 are evaluated by the following method, and the results are provided in the following Table 4.

The cells according to Examples 1 to 5 and Comparative Examples 1 to 3 are charged with a current density of 70 mA/g in a CC/CV mode and maintained at a cut-off voltage of 0.01 V, and the charge was ended at a current of 7 mA/g (10% of current density). The cells are discharged with a current density of 70 mA/g in a CC mode and maintained at a cut-off voltage of 1.5 V.

The initial charge and discharge efficiency (%) in the following Table 4 is calculated as a percentage of initial discharge capacity relative to initial charge capacity.

Referring to the following Table 4, the lithium rechargeable batteries using the ultrasonicated negative active materials according to Examples 1 to 5 show similar or a little better initial efficiency than the lithium rechargeable battery using the non-ultrasonicated but amorphous carbon-coated negative active material according to Comparative Example 2, since the ultrasonication opens flake-shaped natural graphite fragments on the surface part and inside the spherically-shaped natural graphite particle and forms an open gap between the flake-shaped natural graphite fragments and thus increases specific surface area of the negative active materials.

In addition, Example 4 of the spherically-shaped natural graphite-modified composite particle including lithium acetate shows improved initial charge and discharge efficiency compared with Examples 1 to 3 including no lithium acetate and Comparative Example 2 of the carbon-coated flake-shaped natural graphite without ultrasonication. The reason is that the lithium acetate reacts with the flake-shaped natural graphite and effectively removes a rhombohedral graphite structural defect in the flake-shaped natural graphite and thus decreases irreversible capacity in the initial charge and discharge reaction.

Evaluation 8

High-rate Charge Characteristics Analysis of Rechargeable Lithium Battery Cell

The test cells according to Examples 1 to 5 and Comparative Examples 1 to 3 were evaluated regarding high-rate charge characteristics, and the results are provided in the following Table 4.

The cells according to Examples 1 to 5 and Comparative Examples 1 to 3 are charged with a current density of 0.2 to 2 C-rate in a CC mode and maintained at a cut-off voltage of 0.01 V, and then discharged with a current density of 0.2 C-rate in a CC mode and maintained at a cut-off voltage of 1.5 V.

Referring to the following Table 4, the negative active materials manufactured through ultrasonication according to Examples 1 to 5 show excellent high-rate charge characteristics compared with the negative active material coated with amorphous carbon without the ultrasonication according to Comparative Examples 2 and 3. The reason is that the ultrasonication forms an open gap between flake-shaped natural graphite fragments inside and on the surface part of the spherically-shaped natural graphite particle, and the spherically-shaped natural graphite particle is suppressed from compression due to amorphous or semi-crystalline carbon in the open gap and thus has improved reactivity with an electrolyte solution.

Evaluation 9

High-rate Discharge Characteristics Analysis of Rechargeable Lithium Battery Cell The test cells according to Examples 1 to 5 and Comparative Examples 1 to 3 are evaluated regarding high rate discharge characteristics in the following method, and the results are provided in the following Table 4.

The cells according to Examples 1 to 5 and Comparative Examples 1 to 3 are charged with a current density of 0.2 C-rate in a CC/CV mode and maintained at a cut-off voltage of 0.01 V, and then the charge is cut-off at a current of 0.02 C-rate (10% of current density). The cells are discharged in a range of 0.2 to 10 C-rate in a CC mode and maintained at a cut-off voltage of 1.5 V.

Referring to the following Table 4, the negative active materials manufactured through ultrasonication according to Examples 1 to 5 show excellent high-rate discharge characteristics compared with the negative active materials coated with amorphous carbon without the ultrasonication according to Comparative Examples 2 and 3. The reason is that the ultrasonication form an open gap between flake-shaped natural graphite fragments inside and on the surface part of the spherically-shaped natural graphite particle, and the spherically-shaped natural graphite particle is suppressed from compression due to amorphous or semi-crystalline carbon in the open gap and has improved reactivity with an electrolyte solution.

Evaluation 10

Cycle-life Characteristics Analysis of Rechargeable Lithium Battery Cell

The test cells according to Examples 1 to 5 and Comparative Examples 1 to 3 are evaluated regarding cycle-life, and the results are provided in Table 4.

The test cells are charged with a current density of 0.5 C-rate in a CC mode and maintained at a cut-off voltage of 0.01 V. The cells are discharged with a current density of 0.5 C-rate in a CC mode and maintained at a cut-off voltage of 1.5 V, and the charge and discharge are repeated 100 cycles in total.

In the following Table 4, capacity retention (%) is obtained as a percentage of discharge capacity after 100 cycles relative to discharge capacity at an initial cycle.

Referring to the following Table 4, the negative active materials manufactured through ultrasonication according to Examples 1 to 5 show excellent cycle-life characteristics compared with the negative active materials coated with amorphous carbon without the ultrasonication according to Comparative Examples 2 and 3. The reason is that the ultrasonication forms an open gap between flake-shaped natural graphite fragments inside and on the surface part of the spherically-shaped natural graphite particle, and the spherically-shaped natural graphite particle is suppressed from compression due to amorphous or semi-crystalline carbon in the open gap and has improved reactivity with an electrolyte solution. In addition, the reason is that the amorphous or semi-crystalline carbon exists on the surface of the spherically-shaped natural graphite particle and in the open gap on the surface part and inside the spherically-shaped natural graphite particle, and thus bonds the flake-shaped natural graphite fragments and suppresses deterioration of structural stability of the spherically-shaped natural graphite particle.

TABLE 4

|  | Initial charge and discharge efficiency (%) | High-rate charge characteristics charge capacity (mAh/g) | | | High-rate discharge characteristic discharge capacity (mAh/g) | | | | | Capacity retention (%) |
| --- | --- | --- | --- | --- | --- | --- | --- | --- | --- | --- |
|  |  | 0.2 C | 1 C | 2 C | 0.2 C | 1 C | 2 C | 5 C | 10 C |  |
| Ex. 1 | 92.7 | 344 | 247 | 147 | 359 | 359 | 357 | 354 | 282 | 92 |
| Ex. 2 | 93 | 337 | 234 | 130 | 355 | 355 | 355 | 352 | 312 | 91 |
| Ex. 3 | 93.3 | 331 | 232 | 130 | 356 | 356 | 355 | 354 | 310 | 94 |
| Ex. 4 | 94 | 332 | 230 | 115 | 355 | 355 | 354 | 352 | 302 | 95 |
| Ex. 5 | 92.7 | 328 | 229 | 128 | 359 | 359 | 358 | 354 | 298 | 96 |
| Comp. Ex. 1 | 90 | 338 | 162 | 51 | 359 | 359 | 355 | 304 | 179 | 60 |
| Comp. Ex. 2 | 93 | 332 | 220 | 79 | 353 | 351 | 350 | 343 | 248 | 70 |
| Comp. Ex. 3 | 92.5 | 325 | 219 | 96 | 360 | 359 | 358 | 332 | 229 | 80 |

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTIONS OF SYMBOLS

100: spherically-shaped natural graphite-modified composite particle
10: flake-shaped natural graphite fragment
20: open gap
30: amorphous or semi-crystalline carbon

What is claimed is:

1. A negative active material for a rechargeable lithium battery comprising a spherically-shaped natural graphite-modified composite particle, comprising:
   a spherically-shaped natural graphite particle, in which flake-shaped natural graphite fragments build up and assemble into a cabbage shape at a surface part and a random shape at a core part, and
   amorphous or semi-crystalline carbon,
   wherein an open gap between the flake-shaped natural graphite fragments is positioned on the surface part and inside the spherically-shaped natural graphite particle,
   the amorphous or semi-crystalline carbon is coated on the surface of the spherically-shaped natural graphite particle, and the amorphous or semi-crystalline carbon is present in the open gap, and thereby the open gap positioned on the surface part and inside the spherically-shaped natural graphite particle is maintained, and
   the amorphous or semi-crystalline carbon is included in an amount of 1 to 20 parts by weight based on 100 parts by weight of the spherically-shaped natural graphite particle.

2. The negative active material for a rechargeable lithium battery of claim 1, wherein the spherically-shaped natural graphite particle has an average particle diameter (D50) of about 5 to about 40 μm.

3. The negative active material for a rechargeable lithium battery of claim 1, wherein the spherically-shaped natural graphite-modified composite particle further comprises a lithium compound,
   wherein the lithium compound comprises $Li_2O$, $Li_2CO_3$, or a combination thereof, and
   the lithium compound is coated on the surface of the spherically-shaped natural graphite particle, and the lithium compound is present in the open gap positioned on the surface part and inside the spherically-shaped natural graphite particle.

4. The negative active material for a rechargeable lithium battery of claim 3, wherein the lithium compound is included in an amount of about 0.01 to about 10 parts by weight based on 100 parts by weight of the spherically-shaped natural graphite particle.

5. A rechargeable lithium battery, comprising:
   a negative electrode including the negative active material of claim 1;
   a positive electrode; and
   an electrolyte solution.

* * * * *